Aug. 11, 1970　　　D. L. WEST　　　3,524,067
COMPACT LINE GRATING POSITION SENSING DEVICE
Filed June 26, 1968

INVENTOR
DONALD L. WEST

BY David M. Bennett
ATTORNEY.

United States Patent Office 3,524,067
Patented Aug. 11, 1970

3,524,067
COMPACT LINE GRATING POSITION SENSING DEVICE
Donald Lee West, Lexington, Ky., assignor to International Business Machines Corporation, Armonk, N.Y., a corporation of New York
Filed June 26, 1968, Ser. No. 740,346
Int. Cl. G01d 5/34; G01n 21/30; H01j 39/12
U.S. Cl. 250—219                          1 Claim

ABSTRACT OF THE DISCLOSURE

An optical position sensing device utilizes a photocell to detect pulses of light which are generated by reflecting the image of a moving grating back upon the grating to create an alternate light-dark interference pattern. The signal generated by the photocell is transmitted to a control system which can be used to initiate various operations when a controlled object, which is adapted to move with the grating, reaches a certain position by counting the pulses received from the photocell.

BACKGROUND OF THE INVENTION

In automated controls, it is known to use a pair of line gratings in a position indicating device. One of the gratings is moved relative to the other which creates an alternate light-dark bar pattern when a light is shone through the gratings from one side to the other. A detector such as a photocell is placed on the side opposite the light to sense the light-dark pattern. Electrical signals generated by the detector are a measure of the distance of travel of the moving grating. By attaching the moving grating to an object whose position it is desired to precisely determine at any time, the signals generated by the photocell can be used to control various operations, for example, the positioning of automatically operated machine tools or the triggering of some other function such as the flashing of a light when a mirror is positioned correctly in an optical system.

This system has suffered from certain disadvantages. One of the problems is that it is difficult to position the gratings so that the lines of each grating are aligned properly in parallel relationship. Also the grating surfaces must be mounted very close together to produce a sharp pattern. If the grating lines are not properly aligned the light-dark pattern will not be sharp and the correct output will not be generated by the detector. This causes some signals to be missed which results in the control function being actuated later than it should have been. Because of the inability of maintaining correct tolerances under changing atmospheric conditions and the normal wear of moving parts, the closely mounted gratings eventually touch and become scratched as one moves over the other. This causes the delicate optical parts to become damaged and they no longer produce sharp light-dark patterns which are reliable to enable the detector to generate the required signal level. This again results in malfunctions and when it occurs the expensive gratings must be replaced. This type of system has also been found to have low light-dark resolution ratios which are approximately four to one. A relatively low ratio is caused by the high background light which is received by the detector. This aggravates the above problems because even slight misalignment and wear will decrease this ratio to an inoperative level.

BRIEF SUMMARY OF THE INVENTION

A simplified system has now been found which uses a single moving grating with a simple optical system which has a high sensitivity and light-dark resolution and which is durable and is not subject to misalignment problems.

In accordance with this invention there is provided an optical position sensing device comprising a movable line grating with a source of illumination and a detector mounted on one side of the grating and means for reflecting and focusing the image of the grating produced by the illumination of the grating back on itself at a point in front of the detector. When the grating is moved sideways relative to the light source and detector, in a direction perpendicular to the lines of the grating, interference between the grating and the image lines produces alternate illumination and non-illumination of the detector.

DRAWINGS

DETAILED DESCRIPTION

The foregoing features and advantages of the invention will be apparent from the following more particular description of preferred embodiments of the invention as illustrated in the accompanying drawings.

Figure 1:
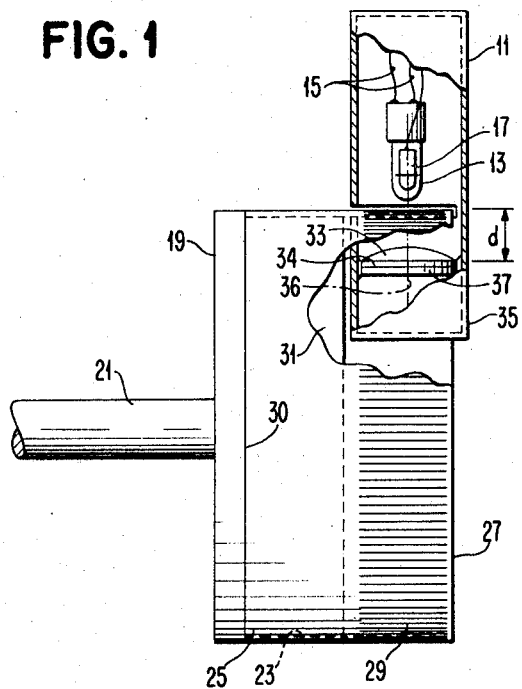
FIG. 1 is a vertical elevation with parts broken away of an embodiment of the apparatus of the invention.

Turning now to the embodiment illustrated in FIG. 1 metal box 11 has mounted therein a source of illumination, lamp 13, which is connected by wires 15 to a conventional power source (not shown). Mounted adjacent to the lamp and just in front of it in the view shown in FIG. 1 is a conventional photodetector, phototransistor 17, whose output signal is connected to a suitable control means (not shown) which counts the signals received from the detector. A cylindrical drum 19 is mouted for rotation by shaft 21 which is connected to a conventional drive means (not shown) such as a servo motor. Drum 19 has a reduced diameter portion 23 forming a shoulder 25. A line grating 27 which is a conventional Mylar, polyethylene glycol terephthalate, base line grating having $\frac{1}{1000}$ inch width lines and spaces has a grating portion 29 which extends beyond the edge of drum portion 23 and an inner portion 31 which is supported by drum portion 23. Grating 27 is positioned by placing its inner edge 30 against the shoulder 25 of drum 19 and is held in place on the surface of drum portion 23 by any convenient means such as by an adhesive between the surface of the drum and the lower surface of the grating. Lens 33 is a plano-convex lens and is fixedly mounted in metal box 35 with its axis on a line 36 between lamp 13 and photocell 17 at a distance $d$ from grating 27 equal to the focal length of lens 33. Mirror 37 is a first surface mirror which is mounted directly behind and adjacent to lens 33 to reflect from surface 34 the bar image produced by lamp 13 shining through grating 27 back through the lens and onto the portion of the grating opposite detector 17. Alternatively the mirror could be made an integral part of the lens by making planar surface 36 reflecting. The mirror could also be mounted at a distance behind the lens as shown by dotted lines 37 but this causes some decrease in the light intensity of the image and also makes the system less compact.

Figure 2:
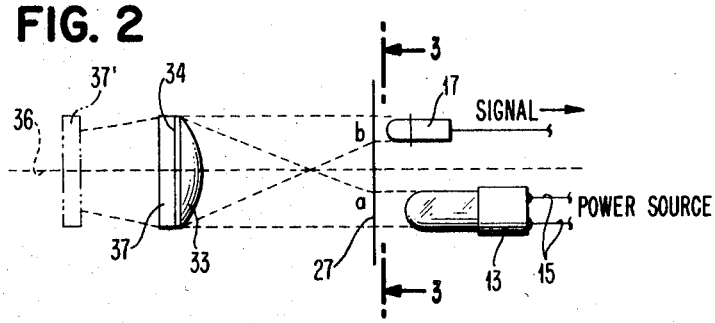
FIG. 2 is a schematic diagram illustrating the optics of the embodiment of the invention of FIG. 1.

FIG. 2 illustrates the optics of the apparatus illustrated in FIG. 1 in schematic fashion. Filament lamp 13 illuminates grating 27 whose lines are perpendicular to the plane of the drawing, at $a$. The illuminated portion is about 0.1 inch in width or about 100 lines. The object information is passed to lenses 33 and reflected by mirror 37 back through lens 33 which acts to form a reflected image on line grating 27 at *b* at a point directly in front of phototransistor 17. As line grating 27 is moved sideways in the plane of the paper the image lines at *b* alternately coincide with and then move between the grating line of grating 27 in a direction opposite to the movement of the grating which produces an interference between the image and the grating lines and results in alternate illumination and non-illumination of phototransistor 17. The phototransistor employed has an acceptance angle of about 15° and is mounted at a distance from the grating to read about ½ of the images or about 50 lines. The resulting signals produced by the phototransistor are counted by the control system which permits the system to measure precisely the movement of the grating and consequently any object which the grating is adapted to move with, for example, by mounting the object for rotation with shaft 21.

Because lens 33 is mounted at a distance corresponding to its focal length from grating 27 the image produced by lamp 13 is focused back onto the grating at a magnification of 1×. Because the image moves in a direction opposite to the movement of the grating the image and grating lines are moving relative to each other at a speed which is twice the speed of the movement of the grating. This produces twice the number of illumination pulses per line for a given rotation of the grating or an increase in the sensitivity by factor of 2. This is equivalent to utilizing a grating having twice the number of lines in the prior art system where one grating is moved over a fixed grating. Because line gratings are expensive to manufacture with the expense directly proportional to the number of lines per inch the invention permits the use of relatively inexpensive gratings having fewer lines while maintaining the desired sensitivity.

Figure 3A:
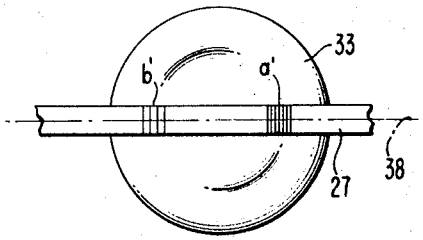
FIGS. 3a and 3b are views of the embodiment shown in FIG. 3 along line 3—3.
Figure 3B:
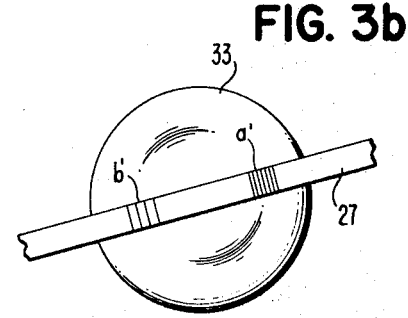

As illustrated in FIGS. 3*a* and 3*b* the axial alignment of the grating 27 with the planar axis 38 of the lens 33 is not critical in the apparatus of the invention. FIG. 3*a* shows the grating in alignment with the portion *a*′ imaged at *b*′. If a slight yaw occurs, for example, about the axis of rotation of the cylinder upon which the grating is mounted, the grating will be in the position shown in FIG. 3*b* (the amount of misalignment being exaggerated for the purpose of illustration). The reflected grating lines *a*′ at *b*′ are still in perfect parallel alignment with the grating lines although the lines are moved slightly in relation to the detector. This constant alignment results from the fact that the optics of the system are symmetrical. Therefore, the image of the grating will always be formed on the grating at a point diametrically opposite to the illuminated portion of the grating. The slight displacement of the image caused by any misalignment can be tolerated by the detector as the illumination-non-illumination, interference pattern and consequently the light-dark ratio is not significally decreased. This is especially so because the simplified optical system produces high light-dark ratios of about 60 to 1.

Figure 4:
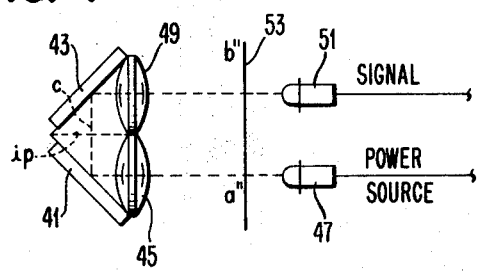
FIG. 4 is a schematic diagram showing the optics of another embodiment of the apparatus of the invention.

Turning now to the embodiment shown in FIG. 4 a different optical system is utilized which permits a shorter, much more compact, optical system to be employed. A pair of planar mirrors 41 and 43 are mounted at a 90° angle to one another. Double convex lens 45 is mounted opposite the light source which is a light-emitting diode 47. Double convex lens 49 is mounted opposite the detector which is a phototransistor 51. The lenses are mounted side by side on a line *c* parallel to the plane of line grating 53 at a distance of twice the focal length of the lenses from the grating and at a distance equal to the focal length from the image point on the mirrors. An imge is formed at *ip* by diode 47 shining on grating 53 at *a*″ through lens 45 and being reflected by mirror 41. The image is reimaged at *b*″ a sufficient distance from *a*″ on the surface of grating 53 by the reflection of the image *ip* by mirror 43 through lens 49. A rugged, miniaturized, very compact system is achieved by the embodiment of FIG. 4 by the use of the solid state illumination source along with the solid state detector and small lenses having short focal lengths.

The position sensor of the invention can be employed in any application where a position sensing device is needed to control operations which must take place when an object has reached a given precise position either in linear or rotational motion.

While the invention has been particularly shown and described with reference to preferred embodiments thereof, it will be understood by those skilled in the art that various changes in form and details may be made therein without departing from the spirit and scope of the invention.

I claim:

1. In an optical position sensing device comprising a line grating, a source of illumination, and a detector mounted on one side of said grating, and an optical system mounted on the other side of said grating which system is adapted to reflect and focus the grating line image, which is produced by said source, back upon said grating at a position opposite the detector and means to move said grating sideways relative to said source, system, and detector in a direction perpendicular to the lines of said grating to cause an interference to occur between the grating lines and the image lines focused on said grating and produce alternate illumination and non-illumination of said detector the improvement wherein said optical system comprises a pair of double convex lenses one of which is mounted opposite said source and the other of which is mounted opposite said detector at a distance of twice the focal length of said lenses, and a pair of reflecting surfaces mounted behind said lenses at about a 90° angle to one another at a distance from said lenses equal to the focal length of said lenses, said source of illumination is a light emitting diode, and said detector is a phototransistor.

References Cited

UNITED STATES PATENTS 3,384,754   5/1968   Albarda _____ 250—237 X
3,453,441   7/1969   Gantz et al. _____ 250—231

ARCHIE R. BORCHELT, Primary Examiner

T. N. GRISBY, Assistant Examiner

U.S. Cl. X.R.

250—231, 237

Disclaimer

3,524,067.—*Donald Lee West*, Lexington, Ky. COMPACT LINE GRATING POSITION SENSING DEVICE. Patent dated Aug. 11, 1970. Disclaimer filed Jan. 17, 1974, by the assignee, *International Business Machines Corporation*.

Hereby enters this disclaimer to claim 1 of said patent.

[*Official Gazette August 27, 1974.*]